(12) United States Patent
Ultsch et al.

(10) Patent No.: US 11,345,801 B2
(45) Date of Patent: May 31, 2022

(54) PROPYLENE-BASED POLYMER COMPOSITIONS WITH EXCELLENT FLEXIBILITY AND HOT AIR WELDABILITY

(71) Applicant: Dow Global Technologies LLC, Midland, MI (US)

(72) Inventors: Stefan Ultsch, Staefa (CH); Caroline Laure Marie Miesch, Horgen (CH); Yushan Hu, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 17/052,651

(22) PCT Filed: May 2, 2019

(86) PCT No.: PCT/US2019/030319
§ 371 (c)(1),
(2) Date: Nov. 3, 2020

(87) PCT Pub. No.: WO2019/213345
PCT Pub. Date: Nov. 7, 2019

(65) Prior Publication Data
US 2021/0238400 A1    Aug. 5, 2021

Related U.S. Application Data

(60) Provisional application No. 62/666,290, filed on May 3, 2018.

(51) Int. Cl.
*C08L 23/12* (2006.01)
*C08K 3/016* (2018.01)
(Continued)

(52) U.S. Cl.
CPC .............. *C08L 23/12* (2013.01); *C08K 3/016* (2018.01); *C08L 23/0815* (2013.01);
(Continued)

(58) Field of Classification Search
CPC ....... C08L 23/12; C08L 53/00; C08L 2207/02; C08I 23/16
See application file for complete search history.

(56) References Cited

U.S. PATENT DOCUMENTS

| 7,592,397 B2 | 9/2009 | Markovich et al. |
| 7,608,668 B2 | 10/2009 | Shan et al. |
(Continued)

FOREIGN PATENT DOCUMENTS

| JP | 2013194077 A | 9/2013 | |
| WO | WO-2004066317 A1 * | 8/2004 | ............... H01B 3/20 |
(Continued)

OTHER PUBLICATIONS

Potemkin, Physical Review E, 1998, vol. 57, No. 6, p. 6902-6912.
(Continued)

*Primary Examiner* — Mark S Kaucher
(74) *Attorney, Agent, or Firm* — Cheney Huang

(57) ABSTRACT

A composition comprising the following components: A) an olefin multi-block copolymer that has a I2 ≤30 g/10 min; B) a propylene-based composition comprising the following: a) a propylene-based polymer; b) a propylene/alpha-olefin interpolymer, a propylene/ethylene interpolymer, or an ethylene/alpha-olefin interpolymer; wherein the propylene-based composition has a $Tm_h$ (highest melting point) ≥130° C.

20 Claims, 2 Drawing Sheets

(51) Int. Cl.
*C08L 23/08* (2006.01)
*C08L 23/16* (2006.01)
*C08L 53/00* (2006.01)

(52) U.S. Cl.
CPC .............. *C08L 23/16* (2013.01); *C08L 53/00* (2013.01); *C08L 2205/02* (2013.01); *C08L 2205/03* (2013.01); *C08L 2207/04* (2013.01)

(56) References Cited

U.S. PATENT DOCUMENTS

| | | | |
|---|---|---|---|
| 7,741,397 | B2 | 6/2010 | Liang et al. |
| 7,858,706 | B2 | 12/2010 | Arriola et al. |
| 7,893,166 | B2 | 2/2011 | Shan et al. |
| 7,947,793 | B2 | 5/2011 | Marchand et al. |
| 9,260,577 | B2 | 2/2016 | Sieradzki et al. |
| 9,669,600 | B2 | 6/2017 | Baldwin et al. |
| 2006/0199930 | A1 | 9/2006 | Shan et al. |
| 2011/0252746 | A1* | 10/2011 | Breck ............... B32B 27/08 53/451 |
| 2014/0288225 | A1* | 9/2014 | Shipley ............ C08L 53/025 524/451 |
| 2015/0314511 | A1 | 11/2015 | Stoiljkovic et al. |
| 2016/0264765 | A1* | 9/2016 | Barry ............... C08L 23/06 |
| 2017/0247536 | A1 | 8/2017 | Peng et al. |

FOREIGN PATENT DOCUMENTS

| | | | |
|---|---|---|---|
| WO | 2005023889 | A1 | 3/2005 |
| WO | 2006/101924 | A2 | 9/2006 |
| WO | 2009/097565 | | 8/2009 |
| WO | 2011/062809 | A1 | 5/2011 |
| WO | 2013134083 | A1 | 9/2013 |
| WO | 2014040914 | A1 | 3/2014 |
| WO | 2014105809 | A1 | 7/2014 |
| WO | WO-2014105809 | A1 * | 7/2014 ............... E04D 5/06 |
| WO | 2016127164 | A1 | 8/2016 |
| WO | 2016127169 | A1 | 8/2016 |
| WO | WO-2016198243 | A1 * | 12/2016 ............... C08L 23/12 |
| WO | WO-2018049300 | A1 * | 3/2018 ............... C08L 53/00 |

OTHER PUBLICATIONS

Dobrynin, J. Chern. Phvs., 1997, vol. 107, No. 21, p. 9234-9238.
"Adflex Q 200 F". 2016, pp. 1-2, XP002792877.
PCT/US2019/030319, International Search Report and Written Opinion dated Aug. 13, 2019.
PCT/US2019/030319, International Preliminary Report on Patentability dated Nov. 3, 2020.

* cited by examiner

PROPYLENE-BASED POLYMER COMPOSITIONS WITH EXCELLENT FLEXIBILITY AND HOT AIR WELDABILITY

CROSS-REFERENCE TO RELATED APPLICATIONS

The present application claims the benefit of priority to U.S. Provisional Patent Application No. 62/666,290, filed on May 3, 2018, which is incorporated herein by reference in its entirety.

BACKGROUND OF THE INVENTION

The "Catalloy process" PP-copolymers (HIFAX) are elastomers extensively used for TPO roofing and waterproofing membranes. However, the high stiffness of such membranes (versus PVC and EPDM membranes) and reduced filler loadings are drawbacks that limit these elastomers in terms of higher membrane thickness, flexibility, hot air weldability, and good fire performance (as described herein). There is a need for new elastomer compositions that can be used to form halogen-free and thicker membranes with good flexibility, good weldability and good fire performance.

Formulations containing a propylene-based polymer and/or an ethylene-based polymer for elastomeric applications are described in the following references: U.S. Pat. Nos. 7,592,397, 7,741,397, 9,669,600, 9,260,577, US20150314511, US20170247536, WO2005023889, WO2006101924, WO2014040914, WO2013134083, WO2009097565, WO2016127164, WO2016127169, U.S. Pat. No. 7,741,397, and JP2013194077A (abstract). However, as discussed above, there remains a need for new elastomer compositions that can be used to form halogen-free membranes and articles with good flexibility, good weldability and good fire performance. This need has been met by the following invention.

SUMMARY OF THE INVENTION

A composition comprising the following components:
A) an olefin multi-block copolymer that has an I2 ≤30 g/10 min;
B) a propylene-based composition comprising the following:
  a) a propylene-based polymer; and
  b) at least one of a propylene/alpha-olefin interpolymer, a propylene/ethylene interpolymer, and an ethylene/alpha-olefin interpolymer;
C) at least one flame retardant; and
wherein the propylene-based composition has a $Tm_h$ (highest melting point) ≥130° C.

DETAILED DESCRIPTION OF THE INVENTION

Figure 1:
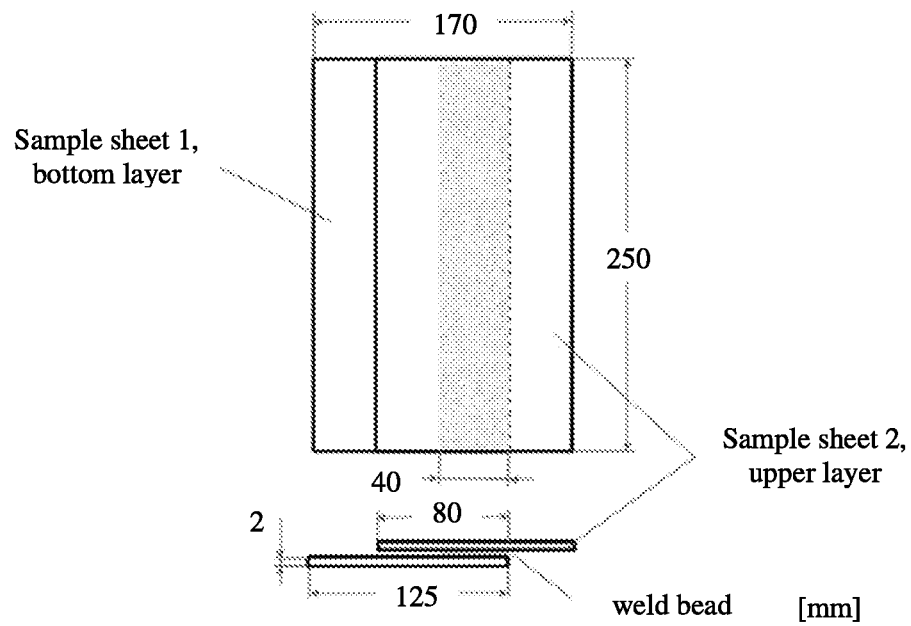
FIG. 1 depicts the sample preparation for the weld test.

Applicant has discovered new elastomer compositions with good flexibility, good weldability and flame retardant properties, and are especially suited for flame retardant roofing formulations. This is an unexpected discovery, since typical elastomer compositions containing random ethylene/alpha-olefin interpolymers or ethylene-styrenic rubbers have insufficient hot air welding properties, when blended, at more than 20 wt %, with propylene-based polymers. It was discovered that the compositions, described herein, allow for a decrease of the E-modulus (measured according to ISO 527-3 at 200 mm/min drawing speed) for example, from about 100 MPa to about 10 MPa, which provides good flexibility for a roofing membrane. Also, these new compositions allow for high filler and flame retardant loadings, for example, up to 50 wt %, based on the weight of the composition.

Moreover, these compositions show excellent hot-air weldability, good fire resistance according to EN 11952-2, and are very easy to process with conventional compounding, extrusion, thermoforming or injection molding processes. These compositions should also have good weathering performance when formulated with common, phenolic, phosphonate, hindered-amine, or adequate colorant pigments like titanium-dioxide, carbon blacks. They also show good cold temperature performance, for example according to ASTM D 746-98.

As discussed above, a composition is provided that comprises the following components:
A) an olefin multi-block copolymer that has an I2 ≤30 g/10 min, or ≤20 g/10 min, or ≤15 g/10 min, or ≤10 g/10 min, or ≤5.0 g/10 min;
B) a propylene-based composition comprising the following:
  a) a propylene-based polymer; and
  b) at least one of a propylene/alpha-olefin interpolymer, a propylene/ethylene interpolymer, and an ethylene/alpha-olefin interpolymer;
  wherein the propylene-based composition has a $Tm_h$ (highest melting point) ≥130° C., or ≥135° C., or ≥140° C., or ≥145° C., or ≥150° C. As used herein, the $Tm_h$ is the highest melting temperature, as determined by DSC.

An inventive composition may comprise a combination of two or more embodiments as described herein.

Each component of an inventive composition may comprise a combination of two or more embodiments as described herein.

In one embodiment, or a combination of embodiments described herein, the propylene-based composition has a $Tm_h$ (highest melting point) from 140° C. to 170° C., or from 145° C. to 165° C., or from 150° C. to 160° C.

In one embodiment, or a combination of embodiments described herein, the composition further comprises at least one flame retardant.

In one embodiment, or a combination of embodiments described herein, the weight ratio of component B to component A ≥1.00, or ≥1.20, or ≥1.30, or ≥1.40, or ≥1.50, or ≥1.55, or ≥1.60, or ≥1.65, or ≥1.70, or ≥1.75, or ≥1.80, or ≥1.85, or ≥1.90.

In one embodiment, or a combination of embodiments described herein, the weight ratio of component B to component A ≥1.95, or ≥2.00, or ≥2.05, or ≥2.10, or ≥2.15, or ≥2.20, or ≥2.25, or ≥2.30, or ≥2.35, or ≥2.40, or ≥2.45, or ≥2.50.

In one embodiment, or a combination of embodiments described herein, the ratio of component B to component A ≥2.55, or ≥2.60, or ≥2.65, or ≥2.70, or ≥2.75, or ≥2.80, or ≥2.85, or ≥2.90, or ≥2.95, or ≥3.00.

In one embodiment, or a combination of embodiments described herein, the weight ratio of component B to component A ≥3.05, or ≥3.10, or ≥3.15, or ≥3.20, or ≥3.25, or 3.30, or ≥3.35, or ≥3.40, or ≥3.45, or ≥3.50.

In one embodiment, or a combination of embodiments described herein, the weight ratio of component B to component A ≤30, or ≤25, or ≤20, or ≤15, or ≤10.

In one embodiment, or a combination of embodiments described herein, the weight ratio of component B to component A ≤8.0, or ≤7.0, or ≤6.0, or ≤5.0.

In one embodiment, or a combination of embodiments described herein, the weight ratio of component B to component A is from 1.00 to 25.0, or from 1.50 to 25.0, or from 1.90 to 25.0.

In one embodiment, or a combination of embodiments described herein, the weight ratio of component B to component A is from 1.90 to 25.0, or from 1.80 to 22.0, or from 1.70 to 20.0, or from 1.60 to 16.0, or from 1.50 to 12.0, or from 1.40 to 10.0, or from 1.30 to 9.00, or from 1.20 to 8.00, or from 1.10 to 7.00, or from 1.00 to 5.00.

In one embodiment, or a combination of embodiments described herein, component B is present in an amount ≥25 wt %, or ≥35 wt %, or ≥45 wt %, or ≥50 wt %, or ≥55 wt %, or ≥60 wt %, or ≥65 wt %, based on the weight of the composition.

In one embodiment, or a combination of embodiments described herein, the olefin multi-block copolymer of component A is an ethylene/alpha-olefin multi-block copolymer. In a further embodiment, the alpha-olefin is a C3-C8 alpha-olefin.

In one embodiment, or a combination of embodiments described herein, component A has a melt index (190° C., 2.16 kg) ≥0.5 g/10 min, or ≥1.0 g/10 min, or ≥1.5 g/10 min, or ≥2.0 g/10 min, or ≥2.5 g/10 min, or ≥3.0 g/10 min, or ≥3.5 g/10 min, or ≥4.0 g/10 min, or ≥4.5 g/10 min, or ≥5.0 g/10 min.

In one embodiment, or a combination of embodiments described herein, component A has a melt index (190° C., 2.16 kg) ≤30 g/10 min, or ≤20 g/10 min, or ≤15 g/10 min, or ≤12 g/10 min, or ≤10 g/10 min, or ≤8.0 g/10 min, or ≤6.0 g/10 min.

In one embodiment, or a combination of embodiments described herein, component A has a melt index (190° C., 2.16 kg) from 0.5 to 6.0 g/10 min, or from 1.0 to 6.0 g/10 min, or from 1.5 to 6.0 g/10 min, or from 2.0 to 6.0 g/10 min, or from 2.5 to 6.0 g/10 min, or from 3.0 to 6.0 g/10 min.

In one embodiment, or a combination of embodiments described herein, component A has a density ≥0.856 g/cc, or ≥0.858 g/cc, or ≥0.860 g/cc, or ≥0.862 g/cc, or ≥0.864 g/cc, or ≥0.866 g/cc (1 cc=1 cm$^3$).

In one embodiment, or a combination of embodiments described herein, component A has a density ≤0.900 g/cc, or ≤0.895 g/cc, or ≤0.890 g/cc, or ≤0.885 g/cc, or ≤0.880 g/cc, or ≤0.875 g/cc, or ≤0.870 g/cc (1 cc=1 cm$^3$).

In one embodiment, or a combination of embodiments described herein, component A has a density from 0.859 to 0.900 g/cc, or from 0.860 to 0.890 g/cc, from 0.862 to 0.885 g/cc, or from 0.864 to 0.880 g/cc, from 0.866 to 0.875 g/cc (1 cc=1 cm$^3$).

In one embodiment, or a combination of embodiments described herein, component A has a melting temperature ($T_m$) ≥100° C., or ≥105° C., or ≥110° C., or ≥115° C. as determined by DSC. In one embodiment, or a combination of embodiments described herein, component A has a melting temperature ($T_m$) ≤170° C., or ≤160° C., or ≤150° C., or ≤140° C., or ≤130° C., or ≤120° C. as determined by DSC.

In one embodiment, or a combination of embodiments described herein, the ratio of the $T_{mh}$ of component B to the $T_m$ of component A is ≥1.05, or ≥1.10, or ≥1.15, or ≥1.20; or from 1.05 to 1.50.

In one embodiment, or a combination of embodiments described herein, component A has a molecular weight distribution (Mw/Mn) from 1.2 to 3.0, further from 1.5 to 3.0, and further from 1.7 to 3.0.

In one embodiment, or a combination of embodiments described herein, component A is present in an amount from 2.0 to 40 wt %, or from 5.0 to 40 wt %, or from 5.0 to 35 wt %, or from 5.0 to 30 wt %, or from 5.0 to 25 wt %, and based on the weight of the composition.

In one embodiment, or a combination of embodiments described herein, the composition comprises ≥40 wt %, or ≥45 wt %, or ≥50 wt %, or ≥55 wt %, or ≥60 wt % of components A and B, based on the weight of the composition. In one embodiment, or a combination of embodiments described herein, the composition comprises ≤98 wt %, or ≤95 wt %, or ≤90 wt %, or ≤85 wt %, or ≤80 wt % of components A and B, based on the weight of the composition.

In one embodiment, or a combination of embodiments described herein, component B has a melt flow rate (230° C., 2.16 kg) ≥0.2 g/10 min, or ≥0.3 g/10 min, or ≥0.4 g/10 min, or ≥0.5 g/10 min, or ≥0.6, or ≥0.7 g/10 min, or ≥0.8 g/10 min.

In one embodiment, or a combination of embodiments described herein, component B has a melt flow rate (230° C., 2.16 kg) ≤10 g/10 min, or ≤8.0 g/10 min, or ≤6.0 g/10 min, or ≤4.0 g/10 min.

In one embodiment, or a combination of embodiments described herein, component B has a melt flow rate (230° C., 2.16 kg) ≤4.0 g/10 min, or ≤3.5 g/10 min, or ≤3.0 g/10 min, or ≤2.5 g/10 min, or ≤2.0 g/10 min, or ≤1.5 g/10 min, or ≤1.0 g/10 min.

In one embodiment, or a combination of embodiments described herein, component B has a density ≥0.860 g/cc, or ≥0.865 g/cc, or ≥0.870 g/cc, or ≥0.875 g/cc, or ≥0.880 g/cc (1 cc=1 cm$^3$).

In one embodiment, or a combination of embodiments described herein, component B has a density ≤0.910 g/cc, or ≤0.905 g/cc, or ≤0.900 g/cc, or ≤0.895 g/cc (1 cc=1 cm$^3$).

In one embodiment, or a combination of embodiments described herein component B has a density from 0.865 to 0.900 g/cc, or from 0.875 to 0.895 g/cc, or from 0.870 to 0.890 g/cc.

In one embodiment, or a combination of embodiments described herein, component B, the weight ratio of subcomponent a to subcomponent b is from 5 to 40, or from 10 to 35, or from 15 to 30.

In one embodiment, or a combination of embodiments described herein, component B comprises a) a propylene-based polymer ("subcomponent a"); and b) at least one of a propylene/alpha-olefin interpolymer, a propylene/ethylene interpolymer, and an ethylene/alpha-olefin interpolymer ("subcomponent b").

In one embodiment, or a combination of embodiments described herein, component B comprises a) a propylene-based polymer ("subcomponent a"); and b) a propylene/alpha-olefin interpolymer, a propylene/ethylene interpolymer, or an ethylene/alpha-olefin interpolymer ("subcomponent b").

In one embodiment, or a combination of embodiments described herein, "subcomponent a" of component B is a polypropylene homopolymer or copolymer.

In one embodiment, or a combination of embodiments described herein, "subcomponent b" of component B comprises one or more of the following: a propylene/alpha-olefin copolymer, a propylene/ethylene copolymer, an ethylene/alpha-olefin copolymer, and an ethylene/alpha-olefin/alpha-olefin terpolymer.

In one embodiment, or a combination of embodiments described herein, component B is an in-reactor blend. In one embodiment, or a combination of embodiments described herein, component B may be prepared based on the Catalloy process. Suitable examples of component B include but are not limited to propylene-based compositions available under the tradenames HIFAX, INSPIRE™, ADFLEX, and Daplen™.

In one embodiment, or a combination of embodiments described herein, the composition comprises ≤0.10 wt %, or ≤0.05 wt %, or ≤0.02 wt % of a crosslinking agent, based on the weight of the composition. In one embodiment, or a combination of embodiments described herein, the composition does not comprise a crosslinking agent.

In one embodiment, or a combination of embodiments described herein, the composition comprises ≤0.10 wt %, or ≤0.05 wt %, or ≤0.02 wt % of a foaming agent, based on the weight of the composition. In one embodiment, or a combination of embodiments described herein, the composition does not comprise a foaming agent.

In one embodiment, or a combination of embodiments described herein, component C comprises at least one of the following: a metal-hydroxide based flame retardants, like aluminum trihydrate, magnesium hydroxide, Huntite, aluminum oxide, a polyphosphonate, a polyphosphate, a hindered amine, a cyanurate.

In one embodiment, or a combination of embodiments described herein, component C comprises at least one of the following: aluminum trihydrate, magnesium hydroxide, aluminum oxide a polyphosphonate, a polyphosphate, a hindered amines, or a cyanurate.

In one embodiment, or a combination of embodiments described herein, the composition comprises less than 2.0 weight percent, further less than 1.0 weight percent, further less than 0.5 weight percent, and further less than 0.1 weight percent, of an oil, based on the weight of the composition. In one embodiment, or a combination of embodiments described herein, the composition does not contain an oil.

In one embodiment, or a combination of embodiments described herein, the composition comprises ≤1.00 wt %, or ≤0.50 wt %, or ≤0.20 wt %, or ≤0.10 wt %, or ≤0.05 wt % of a styrenic block copolymer or terpolymer (for example, an SES, SBS, SEP, etc.), based on the weight of the composition. In one embodiment, or a combination of embodiments described herein, the composition does not comprise a styrenic block copolymer or terpolymer (for example, an SES, SBS, SEP, etc.).

In one embodiment, or a combination of embodiments described herein, the composition comprises ≤1.00 wt %, or ≤0.50 wt %, or ≤0.20 wt %, or ≤0.10 wt %, or ≤0.05 wt % of a polystyrene, based on the weight of the composition. In one embodiment, or a combination of embodiments described herein, the composition does not comprise a polystyrene.

In one embodiment, or a combination of embodiments described herein, the composition comprises ≤50 wt %, or ≤40 wt %, or ≤30 wt %, or ≤20 wt %, or ≤10 wt % of an EVA, based on the weight of the composition.

In one embodiment, or a combination of embodiments described herein, the composition comprises ≤1.00 wt %, or ≤0.50 wt %, or ≤0.20 wt %, or ≤0.10 wt %, or ≤0.05 wt % of an EVA, based on the weight of the composition. In one embodiment, or a combination of embodiments described herein, the composition does not comprise an EVA.

In one embodiment, or a combination of embodiments described herein, the composition comprises ≤1.00 wt %, or ≤0.50 wt %, or ≤0.20 wt %, or ≤0.10 wt %, or ≤0.05 wt % of a polyamide, based on the weight of the composition. In one embodiment, or a combination of embodiments described herein, the composition does not comprise a polyamide.

In one embodiment, or a combination of embodiments described herein, the composition comprises less than 5 weight percent, further less than 2 weight percent, and further less than 1 weight percent, of an azide compound, based on the weight of the composition. In one embodiment, or a combination of embodiments described herein, the composition does not contain an azide compound.

An inventive composition may comprise a combination of two or more embodiments as described herein.

The invention also provides an article comprising at least one component formed from an inventive composition described herein.

The invention also provides a process to form a foam, said process comprising extruding an inventive composition described herein.

An inventive composition may comprise a combination of two or more embodiments as described herein.

An inventive article may comprise a combination of two or more embodiments as described herein.

Olefin Multi-Block Copolymers (Component A)

In one embodiment, the olefin multi-block copolymer, is an ethylene/α-olefin multi-block copolymer, comprises a majority amount of polymerized ethylene, based on the weight of the polymer.

The term "olefin multi-block copolymer and includes, for example, ethylene and one or more copolymerizable α-olefin comonomer in polymerized form, characterized by multiple blocks or segments of two or more polymerized monomer units differing in chemical or physical properties. When referring to amounts of "ethylene" or "comonomer" in the copolymer, it is understood that this means polymerized units thereof. In some embodiments, the multi-block copolymer can be represented by the following formula:

$$(AB)_n,$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, the As and Bs are linked in a substantially linear fashion, as opposed to a substantially branched or substantially star-shaped fashion. In other embodiments, the A blocks and B blocks are randomly distributed along the polymer chain. In other words, the block copolymers usually do not have a structure as follows.

$$AAA\text{-}AA\text{-}BBB\text{-}BB.$$

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin multi block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI (or MWD), from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{for } \Delta H \text{ greater than zero and up to} 130 \text{ J/g,}$$

$$\Delta T \geq 48° \text{ C. for } \Delta H \text{ greater than} 130 \text{ J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or (E) has a storage modulus at 25° C., G' (25° C.), and a storage modulus at 100° C., G'(100° C.), wherein the ratio of G'(25° C.) to G'(100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydro-naphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In one embodiment, the ethylene/α-olefin multi-block copolymer, has a density of less than, or equal to, 0.910 g/cc, further less than, or equal to, 0.905 g/cc, further less than, or equal to, 0.900 g/cc, and further less than, or equal to, 0.885 g/cc.

In one embodiment, the ethylene/α-olefin multi-block copolymer, has a density greater than, or equal to, 0.882 g/cc, further greater than, or equal to, 0.885 g/cc, and further greater than, or equal to, 0.887 g/cc. Density is measured by the procedure of ASTM D-792-08.

In one embodiment, the ethylene/α-olefin multi-block copolymer, has a melting point of greater than 90° C., further greater than 100° C. The melting point is measured by Differential Scanning Calorimetry (DSC) method described in U.S. Publication 2006/0199930 (WO 2005/090427), incorporated herein by reference.

In one embodiment, the ethylene/α-olefin multi-block copolymer, has a melt index (I2) greater than, or equal to, 0.1 g/10 min, further greater than, or equal to, 0.5 g/10 min, and further greater than, or equal to, 1 g/10 min, as determined using ASTM D-1238 (190° C., 2.16 kg load).

In one embodiment, the ethylene/α-olefin multi-block copolymer, has a melt index (I2) less than, or equal to, 50 g/10 min, further less than, or equal to, 20 g/10 min, and further less than, or equal to, 10 g/10 min, as determined using ASTM D-1238 (190° C., 2.16 kg load).

An olefin multi-block copolymer may comprise a combination of two or more embodiments as described herein.

An ethylene/α-olefin multi-block copolymer may comprise a combination of two or more embodiments as described herein.

SOME EMBODIMENTS a) A composition comprising the following components:
A) an olefin multi-block copolymer that has an I2 ≤30 g/10 min;
B) a propylene-based composition comprising the following:
a) a propylene-based polymer; and
b) at least one of a propylene/alpha-olefin interpolymer, a propylene/ethylene interpolymer, and an ethylene/alpha-olefin interpolymer;
wherein the propylene-based composition has a $Tm_h$ (highest melting point) ≥130° C.

b) The composition of a) above, further comprising component C) at least one flame retardant, and wherein subcomponent b) is a propylene/alpha-olefin interpolymer, a propylene/ethylene interpolymer, or an ethylene/alpha-olefin interpolymer.

c) The composition of a) or b) above, wherein the weight ratio of component B to component A ≥1.00 or ≥1.50.

d) The composition of any one of a)-c) above, wherein the weight ratio of component B to component A is from 1.00 to 25.0, or from 1.50 to 25.0, or from 1.50 to 15.0, or from 1.50 to 10.0, or from 1.50 to 8.0, or from 1.50 to 6.0, or from 1.50 to 5.0, or from 1.50 to 4.0.

e) The composition of any one of a)-d) above, wherein component B is present in an amount ≥25 wt %, or ≥30 wt %, based on the weight of the composition.

f) The composition of any one of a)-e) above, wherein the olefin multi-block copolymer of component A is an ethylene/alpha-olefin multi-block copolymer.

g) The composition of f) above, wherein the alpha-olefin is a C3-C8 alpha-olefin.

h) The composition of any one of a)-g) above, wherein component A has a melt index (190° C., 2.16 kg) from 0.5 to 30 g/10 min.

i) The composition of any one of a)-h) above, wherein component A has a melt index (190° C., 2.16 kg) from 0.5 to 8.0 g/10 min.

j) The composition of any one of a)-i) above, wherein component A has a density from 0.860 to 0.890 g/cc.

k) The composition of any one of a) j) above, wherein component A has a melting temperature $(T_m) \geq 100°$ C., as determined by DSC.

l) The composition of any one of a)-k) above, wherein the ratio of the $T_{mh}$ of component B to the $T_m$ of component A is $\geq 1.05$, or $\geq 1.10$, or $\geq 1.15$.

m) The composition of any one of a)-l) above, wherein the ratio of the $T_{mh}$ of component B to the $T_m$ of component A is $\leq 2.00$, or $\leq 1.75$, or $\leq 1.50$.

n) The composition of any one of a)-m) above, wherein component B has a melt flow rate (230° C., 2.16 kg) $\leq 10$ g/10 min, or $\leq 8.0$ g/10 min, or $\leq 6.0$ g/10 min, or $\leq 4.0$ g/10 min, or $\leq 2.0$ g/10 min, or $\leq 1.5$ g/10 min, or $\leq 1.0$ g/10 min.

o) The composition of any one of a)-n) above, wherein component B has a density from 0.870 to 0.910 g/cc.

p) The composition of any one of a)-o) above, wherein for component B, subcomponent a is a polypropylene homopolymer, and subcomponent b is a propylene/ethylene copolymer.

q) The composition of any one of a)-p) above, wherein component B is an in-reactor blend or alloy.

r) The composition of any one of a)-p) above, wherein component B is an impact copolymer polypropylene.

s) The composition of any one of a)-r) above, wherein the composition comprises $\leq 0.1$ wt % of a crosslinking agent, based on the weight of the composition.

t) The composition of any one of a)-s) above, wherein the composition comprises $\leq 0.10$ wt % of a foaming agent, based on the weight of the composition.

u) The composition of any one of a)-t) above, wherein component C comprises at least one of the following: aluminum trihydrate, magnesium hydroxide, aluminum oxide a polyphosphonate, a polyphosphate, a hindered amines, or a cyanurate.

v) The composition of any one of a)-u) above, wherein the composition further comprises a tensile modulus $\leq 100$ MPa in accordance with ISO 527-3.

w) The composition of any one of a)-v) above, wherein the composition further comprises a tensile strength $\geq 7$ MPa in accordance with ISO 527-3.

x) The composition of any one of a)-w) above, wherein the composition further comprises a tensile modulus from 20 to 100 MPa and a tensile strength greater than 7 MPa in accordance with ISO 527-3.

y) The composition of any one of a)-x) above, wherein the composition further comprises good weldability in accordance with the methods described herein.

z) An article comprising at least one component formed from the composition of any one of a)-y) above.

Additives

In one embodiment, an inventive composition comprises at least one additive. Suitable additives include, but are not limited to, fillers, antioxidants, UV stabilizers, flame retardants, colorants or pigments, zinc oxide, stearic acid, zinc stearate, mold release agents, processing aids, functional fibers, flame retardant co-agents, adhesion promoters, surface modifiers, antistatic agents and combinations thereof.

Antioxidants include, but are not limited to, hindered phenols, bisphenols, and thiobisphenols; substituted hydroquinones; tris(alkylphenyl)phosphites; dialkylthiodi-propionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine; hexahydro-1,3,5-tris-β-(3,5-di-t-butyl-4-hydroxyphenyl)propionyl-s-triazine; 2,4,6-tris(n-1,4-dimethylpentylphenylene-diamino)-1,3,5-triazine; and tris-(3,5-di-t-butyl-4-hydroxybenzyl)isocyanurate.

Applications

The invention also provides for an article comprising at least one component formed from an inventive composition. Articles include, but are not limited to, roofing materials, weather strips, belts, hoses, wire and cable jacketing, tubes, flooring materials, gaskets, molded goods, sheets, and extruded parts. Additional articles include footwear components, sporting goods, automotive parts (for example, dashboards and window seals), computer parts, household appliances and toys.

Compositions may be formed into a finished article of manufacture by any one of a number of conventional processes and apparatus. Illustrative processes include, but are not limited to, extrusion, calendaring, injection molding, compression molding, and other typical processes known in the art. For example, articles can be prepared by injection molding, extrusion, extrusion followed by thermoforming, low pressure molding, compression molding, bun foam process, and the like.

DEFINITIONS

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers such as terpolymers.

The term, "olefin-based polymer," as used herein, refers to a polymer that comprises, in polymerized form, 50 wt % or a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, 50 wt % or a majority amount of ethylene monomer (based on the weight of the polymer), and optionally may comprise one or more comonomers.

The term, "ethylene/α-olefin interpolymer," as used herein, refers to an interpolymer that comprises, in polymerized form, 50 wt % or a majority amount of ethylene monomer (based on the weight of the interpolymer), and at least one α-olefin. As used in the context of this disclosure, ethylene/α-olefin interpolymer excludes ethylene/α-olefin multi-block interpolymers.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types. As used in the context of this disclosure, ethylene/α-olefin copolymer excludes ethylene/α-olefin multi-block copolymers.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The term "propylene-based polymer composition," as used herein, refers to a composition that comprises a majority amount of a propylene-based polymer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Polymer density was measured in accordance with ASTM D-792.

Melt Index

Melt index (I2) of an ethylene-based polymer is measured in accordance with ASTM D-1238, condition 190° C./2.16 kg. Melt index (I5) of an ethylene-based polymer is measured in accordance with ASTM D-1238, condition 190° C./5.0 kg. Melt index (I10) of an ethylene-based polymer is measured in accordance with ASTM D-1238, condition 190° C./10.0 kg. High load melt index (I21) of an ethylene-based polymer is measured in accordance with ASTM D-1238, condition 190° C./21.0 kg. For propylene-based polymers, the melt flow rate (MFR) is measured in accordance with ASTM D-1238, condition 230° C./2.16 kg.

Differential Scanning Calorimetry (DSC)

Differential Scanning Calorimetry (DSC) is used to measure crystallinity in ethylene-based (PE) samples and propylene-based (PP) samples. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature (TO is determined from the first cooling curve.

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4-trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene}=A \times (M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

Evaluation of the Mechanical Properties

The physical strength of each polymeric membrane was evaluated by tensile testing according to ISO 527-3 using 5A punched test pieces, at 200 mm/min drawing speed. Each membrane was tested in machine direction and cross direction (MD and CD, respectively), and the average of five samples reported.

Evaluation of the Hot Air Welding Properties (Welding Test)

The polymeric membranes were heat welded with a Leister Triac-S hand-held heat welder. The membranes were overlapped by 8 cm, and heat welded using a 20 mm wide die nozzle, at a welder set temperature of 230° C., using the following method: 3 points weld to fix the membranes, first weld and second slower weld. The samples were stored at ambient conditions for 24 hours, and "1 cm" test pieces, were cut perpendicular over the welding seam, and subjected to tensile tested using pliers.

Figure 2:
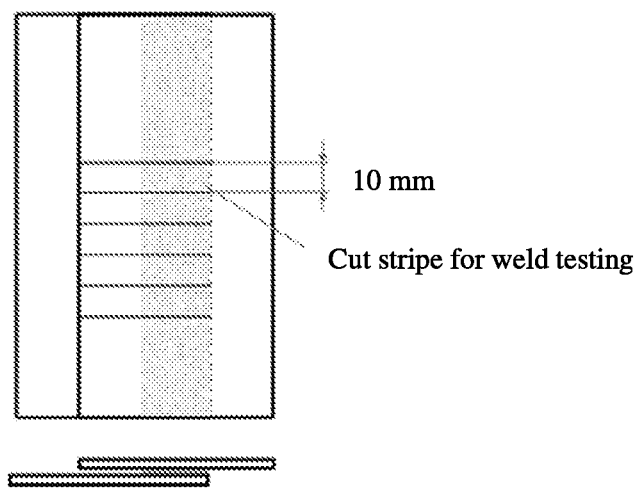
FIG. 2 depicts the cutting of a strip (test sample) for the weld test.
Figure 3:
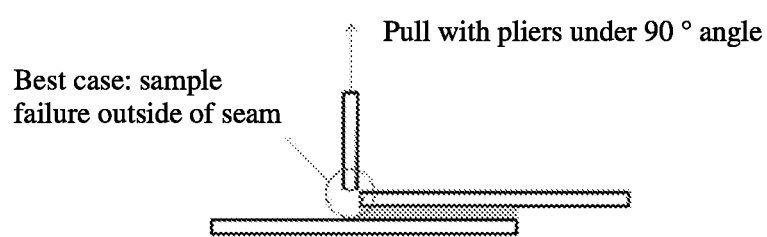
FIG. 3 depicts the testing (plier pull) of the test sample for the weld test.

The samples were rated from 0 (bad weld: failure occurring at the welded seam) to 5 (very good weld with failure occurring outside of the welded seam). Each membrane had been welded and tensile tested twice. A description of the weld testing method is shown in FIGS. 1-3, as follows: FIG. 1 depicts the sample preparation for weld testing. FIG. 2 depicts the cutting of a strip (test sample) for weld testing. FIG. 3 depicts the testing of weld quality—tear with pliers until sample failure.

Evaluation of the Fire Performance

The fire performance of flame retardant properties were tested according to EN 11952-2 (small burner test), in the edge ignition mode according to Euroclass D (30 s of flame application and a total test time of 60 s). Each formulation was tested five times, and an average reported.

EXPERIMENTAL

Materials

Materials used in this study are listed in Table 1 below. The composition of the PE-Stabilizer Masterbatch is listed in Table 2 below.

TABLE 1

| | | Materials | | | |
|---|---|---|---|---|---|
| Name | Supplier | Description | Density (g/cc) | I2 (g/10 min) | Tm (° C.) |
| INFUSE 9507 | Dow | Ethylene/octene multi-block copolymer | 0.866 | 5.0 | 120 |
| INFUSE 9900 | Dow | Ethylene/octene multi-block copolymer | 0.880 | 30.0 | 120 |
| ENGAGE 8842 | Dow | Ethylene/octene random copolymer | 0.857 | 1.0 | 38 |
| HIFAX CA10A | LBI | Catalloy PP/EPR in reactor blend | 0.88 | 0.6 (MFR 230° C./ 2.16) | 142* |
| INSPIRE 137 | Braskem | Impact copolymer PP | 0.900 | 0.8 (MFR 230° C./ 2.16) | 165 |
| INSPIRE 215 | Braskem | Homopolymer PP | 0.900 | 2.1 (MFR 230° C./ 2.16) | 165 |
| PE-Stabilizer Masterbatch | | INFUSE 9507 based TiO2/ stabilizer Masterbatch | | 3 | 120 |
| HYDROMAG Q3005 | Chimica Del Rey | Magnesium hydroxide | 2.42 | NA | NA |
| OMYALITE 95T | Omya | Calcium carbonate | 2.7 | NA | NA |

*$Tm_h$

TABLE 2

| PE-Stabilizer Masterbatch Composition* | | | | |
|---|---|---|---|---|
| Component | Supplier | Description | Density (g/cc) | wt % (g/10 mm) |
| INFUSE 9507 | Dow | Ethylene/octene multi-block copolymer | 0.866 | 34 |
| KRONOS 2220 | Kronos Titan | Rutile type Titanium-Dioxide | 4 | 53.6 |
| CHIMASORB 2020 | BASF Plastic Additive Systems | Hindered Amine light stabilizer (HALS) | 1 | 11 |
| IRGASTAB FS 301 FF | BASF Plastic Additive Systems | Phosphite/polyamide processing and UV stabilizer | 1 | 1.4 |

*The masterbatch composition was compounded on a BUSS PR 46.

Example Set 1

Formulations (compositions) for Examples Comp-1 to Comp-5 and Inv-1 to Inv-8 are listed in Table 3.

Comparative composition 1 and inventive compositions 1 and 2 each represent a roofing formulation according to North American standards, with the colorant stabilizer masterbatch and 38.2 wt % of the Mg(OH)$_2$ flame retardant. Comparative composition 1 is a "HIFAX CA10A" reference composition. Inventive compositions 1 and 2 are made from 80/20 and 60/40 blends, respectively, from HIFAX CA10A and INFUSE 9507.

Comparative composition 2 and inventive compositions 3 and 4 each represent a European roofing formulation, with the colorant stabilizer masterbatch, 39.0 wt % of the Mg(OH)$_2$ flame retardant, and 9.8 wt % of the calcium carbonate. Comparative composition 2 is a "HIFAX CA10A" reference composition. Inventive compositions 3 and 4 are made from 80/20 and 60/40 blends, respectively, from HIFAX CA10A with INFUSE 9507.

Inventive compositions 5 and 6 are made from 70/30 and 96/4 blends, respectively, from HIFAX CA10A and INFUSE 9507, with the colorant stabilizer masterbatch and 38.2 wt % of the Mg(OH)$_2$ flame retardant. Inventive composition 7 is made from 60/40 HIFAX CA10A/INFUSE 9507 blend with only colorant stabilizer masterbatch and without Mg(OH)$_2$. Comparative composition 3 is made from 40/60 HIFAX CA10A/INFUSE 9507 blends with colorant stabilizer masterbatch and 38.2 wt % Mg(OH)$_2$ flame retardant. Inventive composition 8 is made from 70/30 HIFAX CA10A/INFUSE 9900 blend, with the colorant stabilizer masterbatch and 38.2 wt % of the Mg(OH)$_2$ flame retardant. Comparative compositions 4 and 5 are made from 60/40 blends of HIFAX CA10A and ENGAGE 8842.

TABLE 3

Formulations for Comp-1 to Comp-5 and Inv-1 to Inv-8

| Example | Comp-1 | Inv-1 | Inv-2 | Comp-2 | Inv-3 | Inv-4 | Inv-5 | Inv-6 | Inv-7 | Comp-3 | Inv-8 | Comp-4 | Comp-5 |
|---|---|---|---|---|---|---|---|---|---|---|---|---|---|
| Material (wt%, based on weight of composition) | | | | | | | | | | | | | |
| GRANULES | | | | | | | | | | | | | |
| HIFAX CA10A | 58.8 | 47.1 | 35.3 | 48.8 | 39.0 | 29.3 | 41.2 | 56.5 | 57.1 | 23.5 | 41.2 | 35.3 | 57.1 |
| INFUSE 9507 | | 11.8 | 23.5 | | 9.8 | 19.5 | 17.6 | 2.4 | 38.1 | 35.3 | | | |
| INFUSE 9900 | | | | | | | | | | | 17.6 | | |
| ENGAGE 8842 | | | | | | | | | | | | 23.5 | 38.1 |
| PE-Stabilizer Batch 812416 | 2.9 | 2.9 | 2.9 | 2.4 | 2.4 | 2.4 | 2.9 | 2.9 | 4.8 | 2.9 | 2.9 | 2.9 | 4.8 |
| POWDER | | | | | | | | | | | | | |
| HIDROMAG Q3005 | 38.2 | 38.2 | 38.2 | 39.0 | 39.0 | 39.0 | 38.2 | 38.2 | | 38.2 | 38.2 | 38.2 | |
| OMYALITE 95T | | | | 9.8 | 9.8 | 9.8 | | | | | | | |
| Total % | 100 | 100 | 100 | 100 | 100 | 100 | 100 | 100 | 100 | 100 | 100 | 100 | 100 |
| Material (PHR, based on sum weight of polymer components) | | | | | | | | | | | | | |
| GRANULES | | | | | | | | | | | | | |
| HIFAX CA10A | 100 | 80 | 60 | 100 | 80 | 60 | 70 | 96 | 60 | 40 | 70 | 60 | 60 |
| INFUSE 9507 | | 20 | 40 | | 20 | 40 | 30 | 4 | 40 | 60 | | | |
| INFUSE 9900 | | | | | | | | | | | 30 | | |
| ENGAGE 8842 | | | | | | | | | | | | 40 | 40 |
| PE-Stabilizer MB | 5 | 5 | 5 | 5 | 5 | 5 | 5 | 5 | 5 | 5 | 5 | 5 | 5 |
| POWDER | | | | | | | | | | | | | |
| HYDROMAG Q3005 | 65 | 65 | 65 | 80 | 80 | 80 | 65 | 65 | | 65 | 65 | 65 | |
| OMYALITE 95T | | | | 20 | 20 | 20 | | | | | | | |
| Total PHR | 170 | 170 | 170 | 205 | 205 | 205 | 170 | 170 | 105 | 170 | 170 | 170 | 105 |
| B/A | — | 4.0 | 1.5 | — | 4.0 | 1.5 | 2.3 | 24.0 | 1.5 | 0.7 | 2.3 | 1.5 | 1.5 |

Each formulation was compounded on a "ZE 25 mm" direct extrusion line, and shaped through a "300 mm wide" flat slit, and a three stage calendar, into "1 mm thick" sheets. The compounding, extrusion and shaping conditions for Examples Comp-1 to Comp-5 and Inv-1 to Inv-8 are listed in Table 4.

TABLE 4

Extrusion Conditions for Comp-1 to Comp-5 and Inv-1 to Inv-8

| Example | Comp-1 | Inv-1 | Inv-2 | Comp-2 | Inv-3 | Inv-4 | Inv-5 |
|---|---|---|---|---|---|---|---|
| Barrel T setting (° C.) | 180 | 180 | 180 | 180 | 180 | 180 | 180 |
| Die T setting (° C.) | 190 | 190 | 190 | 190 | 190 | 190 | 180 |
| Screw speed (RPM) | 210 | 210 | 210 | 210 | 210 | 210 | 190 |
| Throughput (kg/h) | 10 | 10 | 10 | 10 | 10 | 10 | 10 |
| Melt T (° C.) | 199 | 196 | 195 | 201 | 201 | 195 | 198 |
| Die pressure (bar) | 115 | 100 | 86 | 91 | 86 | 79 | 88 |
| Torque (%) | 51 | 49 | 46 | 45 | 44 | 44 | 46 |
| Line speed (m/min) | 0.50 | 0.44 | 0.41 | 0.42 | 0.41 | 0.38 | 0.48 |

TABLE 4-continued

Extrusion Conditions for Comp-1 to Comp-5 and Inv-1 to Inv-8

| Example | Inv-6 | Inv-7 | Comp-3 | Inv-8 | Comp-4 | Comp-5 |
|---|---|---|---|---|---|---|
| Barrel T setting (° C.) | 180 | 180 | 180 | 180 | 180 | 180 |
| Die T setting (° C.) | 180 | 180 | 180 | 180 | 180 | 180 |
| Screw speed (RPM) | 190 | 190 | 190 | 190 | 190 | 190 |
| Throughput (kg/h) | 10 | 10 | 10 | 10 | 10 | 10 |
| Melt T (° C.) | 198 | 195 | 195 | 196 | 197 | 195 |
| Die pressure (bar) | 87 | 74 | 56 | 67 | 70 | 94 |

TABLE 4-continued

Extrusion Conditions for Comp-1 to Comp-5 and Inv-1 to Inv-8

| Example | Comp-1 | Inv-1 | Inv-2 | Comp-2 | Inv-3 | Inv-4 | Inv-5 |
|---|---|---|---|---|---|---|---|
| Torque (%) | 49 | 58 | 38 | 40 | 51 | | 68 |
| Line speed (m/min) | 0.47 | 0.62 | 0.43 | 0.48 | 0.40 | | 0.61 |

Table 5 shows the tensile properties and weldability results for Examples Comp-1 to Comp-5 and Inv-1 to Inv-8. Test samples for tensile testing were each pulled at 200 mm/min, according to ISO-527-3, under ambient conditions.

TABLE 5

Mechanical Properties and Weldability for Comp-1 to Comp-5 and Inv-1 to Inv-8 (Cross Direction)

| Example | Comp-1 | Inv-1 | Inv-2 | Comp-2 | Inv-3 | Inv-4 | Inv-5 |
|---|---|---|---|---|---|---|---|
| Sample thickness (mm) | 1.05 | 1.07 | 1.14 | 1.06 | 1.09 | 1.16 | 1.15 |
| Tensile Modulus (MPa) | 105 | 55 | 28 | 132 | 63 | 30 | 30.6 |
| Tensile Strength at Break (MPa) | 15.4 | 10.0 | 7.3 | 12.2 | 9.5 | 7.4 | 9.7 |
| Break Elongation (%) | 810 | 884 | 1026 | 765 | 851 | 1053 | 998 |
| Welding Test | Pass* | Pass | Pass | Pass | Pass | Pass | Pass |

| Example | Inv-6 | Inv-7 | Comp-3 | Inv-8 | Comp-4 | Comp-5 |
|---|---|---|---|---|---|---|
| Sample thickness (mm) | 1.1 | 1.04 | 1.15 | 1.07 | 1.17 | 1.10 |
| Tensile Modulus (MPa) | 76.5 | 14.5 | 14 | 51.3 | 31 | 16 |
| Tensile Strength at Break (MPa) | 14.6 | 10.6 | 6.0 | 12.1 | 12.2 | 16.1 |
| Break Elongation (%) | 845 | 1155 | 1509 | 916 | 979 | 1016 |
| Welding Test | Pass | Pass | Pass | Pass | Fail | Fail* |

*Pass: Seam intact, sample failure outside the seam; Fail: Seam delaminated

As seen in Table 5, the flexibility is improved (decrease in the modulus) by the addition of the INFUSE 9507 (30 MI, 0.866 g/cm³ density) to HIFAX CA10A. The two HIFAX CA10A based comparative examples (Comp-1 and Comp-2) have a tensile modulus of 105 and 132 MPa, respectively. The inventive examples (Inv-1 to Inv-8) all have significantly lower tensile modulus, ranging from 20 to 100 MPa. Although, the tensile strength is reduced for the inventive compositions, the tensile strength is still above the common membrane requirements of 7 MPa. The inventive examples (Inv-1 to Inv-8) have a HIFAX CA10A to OBC ratio from 96/4 to 80/20, to 70/30 and to 60/40. As the HIFAX CA10A to OBC ratio goes to 40/60 (meaning more INFUSE OBC in the blend), the tensile modulus (12 MPa) and tensile strength (6 MPa) become very low, as shown in the comparative example Comp-3. Inventive composition Inv-8 uses a different OBC (INFUSE 9900, 30 MI, 0.880 g/cm³ density) as the blending component with HIFAX CA10A. This example also shows improved flexibility (lower modulus ≤100 MPa) and good tensile strength (>7 MPa). Elongation at Break is also improved for the inventive compositions as compared to HIFAX CA10A based comparative examples (Comp-1 and Comp-2). The comparative examples (Comp-4 and Comp-5) made from blends of HIFAX CA10A and ethylene/octene random copolymer ENGAGE 8842 also have improved flexibility (Tensile modulus 31 and 16 MPa respectively) and good tensile strength (12.2 and 16.1 MPa, respectively). However, they fail the weldability test (see the following discussion).

The "hot air weldability" of each final membrane was evaluated by welding with a LEISTER TRIAC 5, hand-held, at 300° C., with a 25 mm nozzle at a welding speed of about 20 cm/min. The quality of the weld seams was tested after 24 hours at room temperature, again according to contractor standards, by pulling 10 mm strips with a plier. The indication of a "pass" for the welding test (good weldability) is that during the pulling of the welded strip, the seam remains intact, whereas the membrane elongates and finally breaks outside of the seam. This type of failure mode indicates strong weldability and is considered passing the welding test. The indication of a "fail" for the welding test correlates to the un-desired failure mode which is the delamination at the seam, indicating poor weldability of the two membranes. All the inventive examples pass the weldability test, with the sample failure being outside the seam in every case. While some comparative examples (Comp-1 to Comp-3) also pass the weldability test, they does not have desired flexibility (Tensile Modulus <100 MPa) and good tensile strength (>7 MPa). The comparative examples (Comp-4 and Comp-5) made from blends of HIFAX CA10A and ethylene/octene random copolymer ENGAGE 8842 do not pass the weldability test as the seams show delamination when pulled.

In summary, the inventive examples relating HIFAX CA10A and INFUSE OBC have good flexibility (<100 MPa), good tensile strength (>7 MPa) and good weldability, where the HIFAX CA10A to OBC ratio is from 1.5 to 25 (i.e., 96/4 to 60/40). This is surprising since all three properties of good flexibility (<100 MPa), good tensile strength (>7 MPa) and good weldability are not expected over the 1.5 to 25 ratio range (i.e., 96/4 to 60/40) of PP based polyolefin to OBC. Indeed, with increasing amounts of OBC in a PP based polyolefin to OBC ratio, one of ordinary skill in the art would expect poor tensile strength and/or poor weldability.

The fire performance of the flame retardant compounds was evaluated in small burner tests, according to EN 11952-2 in accordance with Euroclass B requirements: 30 s of flame exposure at a total test time of 60 s, class B in edge ignition. Table 6 lists the test results (time in seconds to reach the 150 mm mark and the observation).

The inventive formulations have the same fire performance level as the comparative samples. For the monolayer sheets of about 1 mm thickness, the time to burn up to 150 mm was in the range from 40 to 50 s, and all samples showed burning droplets. Thus, formulations with such fire performance should pass EN 1187 roofing membrane system tests, when run made into "1.5 mm thick" fabric reinforced roofing membranes.

TABLE 6

Small Burner Fire Testing according to EN 11952-2

| | Comp-1 | Inv-1 | Inv-2 | Comp-2 | Inv-3 | Inv-4 |
|---|---|---|---|---|---|---|
| Sample thickness (mm) | 1.05 | 1.07 | 1.05 | 1.1 | 1.06 | 1.09 |
| Time to 150 mm (sec) | 47 | 39 | 43 | 53 | 49 | 52 |
| Burning droplets | Yes | Yes | Yes | Yes | Yes | Yes |

Example Set 2

The Examples Comp-6 to Comp-10, Inv-9 expands to different types of PP materials as the blending component with INFUSE OBC (INFUSE 9507). Formulations (compositions) for Examples Comp-6 to Comp-10 and Inv-9 are listed in Table 7.

Comparative composition 6-9 use homopolymer PP (INSPIRE 215) as the blending component. Comp-6, Comp-7 and Comp-8 have the ratio of INSPIRE 215 to OBC of 80/20, 60/40 and 40/60, respectively, with the colorant stabilizer masterbatch and 38.2 wt % of the Mg(OH)$_2$ flame retardant. Comp-9 has the ratio of INSPIRE 215 to OBC of 60/40, with only the colorant stabilizer masterbatch and without the flame retardant. Comparative composition 10 and Inventive composition 9 use an impact copolymer PP (INSPIRE 137) as the blending component. Comp-10 has the ratio of INSPIRE 137 to OBC of 40/60 with the colorant stabilizer masterbatch and 38.2 wt % of the Mg(OH)$_2$ flame retardant. Inv-9 has the ratio of INSPIRE 137 to OBC of 60/40, with only the colorant stabilizer masterbatch and without the flame retardant.

TABLE 7

Formulations for Comp-6 to Comp-10 and Inv-9

| Example | Comp-6 | Comp-7 | Comp-8 | Comp-9 | Comp-10 | Inv-9 |
|---|---|---|---|---|---|---|
| Material (wt%, based on weight of composition) | | | | | | |
| GRANULES | | | | | | |
| INSPIRE 215 (homo PP) | 47.1 | 35.3 | 23.5 | 57.1 | | |
| INSPIRE 137 (impact copolymer PP) | | | | | 23.5 | 57.1 |
| INFUSE 9507 (OBC) | 11.8 | 23.5 | 35.3 | 38.1 | 35.3 | 38.1 |
| PE-Stabilizer Batch 812416 | 2.9 | 2.9 | 2.9 | 4.8 | 2.9 | 4.8 |
| POWDER | | | | | | |
| HIDROMAG Q3005 | 38.2 | 38.2 | 38.2 | 0.0 | 38.2 | |
| Total % | 100 | 100 | 100 | 100 | 100 | 100 |
| Material (PHR, based on sum weight of polymer components) | | | | | | |
| GRANULES | | | | | | |
| INSPIRE 215 | 80 | 60 | 40 | 60 | | |
| INSPIRE 137 | | | | | 40 | 60 |
| INFUSE 9507 | 20 | 40 | 60 | 40 | 60 | 40 |
| PE-Stabilizer MB | 5 | 5 | 5 | 5 | 5 | 5 |
| POWDER | | | | | | |

TABLE 7-continued

Formulations for Comp-6 to Comp-10 and Inv-9

| Example | Comp-6 | Comp-7 | Comp-8 | Comp-9 | Comp-10 | Inv-9 |
|---|---|---|---|---|---|---|
| HYDROMAG Q3005 | 65 | 65 | 65 | | 65 | |
| Total PHR | 170 | 170 | 170 | 105 | 170 | 105 |
| B/A | 4.0 | 1.5 | 0.7 | 1.5 | 0.7 | 1.5 |

Each formulation was compounded on a "ZE 25 mm" direct extrusion line, and shaped through a "300 mm wide" flat slit, and a three stage calendar, into "1 mm thick" sheets. The compounding, extrusion and shaping conditions for Examples Comp-6 to Comp-10 and Inv-9 are listed in Table 8.

TABLE 8

Extrusion Conditions for Comp-6 to Comp-10 and Inv-9

| Extrusion Conditions | Comp-6 | Comp-7 | Comp-8 | Comp-9 | Comp-10 | Inv-9 |
|---|---|---|---|---|---|---|
| Barrel T setting (° C.) | 180 | 180 | 180 | 180 | 180 | 180 |
| Die T setting (° C.) | 180 | 180 | 180 | 180 | 180 | 180 |
| Screw speed RPM) | 190 | 190 | 190 | 190 | 190 | 190 |
| Throughput kg/h) | 10 | 10 | 10 | 10 | 10 | 10 |
| Melt T (° C.) | 195 | 195 | 196 | 194 | 195 | 195 |
| Die pressure (bar) | 53 | 46 | 48 | 60 | 50 | 73 |
| Torque (%) | 41 | 38 | 41 | 58 | 44 | 64 |
| Line speed (m/min) | 0.49 | 0.48 | 0.46 | 0.66 | 0.44 | 0.58 |

Table 9 shows the tensile properties and weldability results for Examples Comp-6 to Comp-10 and Inv-9. The testing conditions are the same as described in the earlier examples. The comparative examples based on homo PP INSPIRE 215 have much higher tensile modulus (>100 MPa) for Comp-6, Comp-7 and Comp-9, meaning poor flexibility. Comp-8 shows low modulus (49.3 MPa); however, the tensile strength of 5.3 MPa is lower than desired. In addition, it Comp-8 and Comp-9 do not pass the weldability test as some seams of the seal show adhesive failure mode. These examples demonstrates homo-PP is not a good candidate as a blending component.

Comp-10 shows low modulus (49.3 MPa); however, the tensile strength of 5.5 MPa is lower than desired. In contrast, Inv-9 shows low modulus (58.4 MPa) and good tensile strength (7.7 MPa), as well as good weldability. It appears that the impact copolymer PP can be a good candidate for blending to OBC to impart good flexibility (≤100 MPa), good tensile strength (>7 MPa) and good weldability. This is surprising since a composition with an impact copolymer PP to OBC ratio of 1.5 (60/40) is not expected to have all three properties of good flexibility (≤100 MPa), good tensile strength (>7 MPa) and good weldability. Indeed, with such a high amount of OBC, one of ordinary skill in the art would expect poor tensile strength and/or poor weldability.

TABLE 9

Mechanical Properties and Weldability for Comp-6 to
Comp-10 and Inv -9 (Cross Direction)

| Example | Comp-6 | Comp-7 | Comp-8 | Comp-9 | Comp-10 | Inv-9 |
|---|---|---|---|---|---|---|
| Sample thickness (mm) | 1.09 | 1.05 | 1.12 | 1.03 | 1.06 | 1.05 |
| Tensile Modulus MPa) | 1120 | 358 | 49.3 | 112 | 39.5 | 58.4 |
| Tensile Strength at Break (MPa) | 15.2 | 11.1 | 5.3 | 9.0 | 5.5 | 7.7 |
| Break Elongation (%) | 525 | 513 | 622 | 439 | 936 | 650 |
| Welding Test | Pass | Pass | Fail | Fail | Pass | Pass |

What is claimed is:

1. A composition comprising the following components:
A) an olefin multi-block copolymer that has an I2≤30 g/10 min (190° C., 2.16 kg);
B) a propylene-based composition comprising the following:
   a) a propylene-based polymer; and
   b) at least one of a propylene/alpha-olefin interpolymer, a propylene/ethylene interpolymer, and an ethylene/alpha-olefin interpolymer;
wherein the propylene-based composition has a $Tm_h$ (highest melting point) ≥130° C.; and
   wherein the composition comprises from 40 wt % to 85 wt % of components A and B, based on the weight of the composition; and wherein the composition comprises a tensile modulus from 20 to 100 MPa in accordance with ISO 527-3, a tensile strength >7 MPa in accordance with ISO 527-3, and good weldability ('pass' for a welding test, wherein a 'pass' for the welding test is that during the pulling of a welded strip with a seam of the composition, the seam remains intact).

2. The composition of claim 1, further comprising component C) at least one flame retardant, and wherein subcomponent b) of component B) is selected from a propylene/alpha-olefin interpolymer, a propylene/ethylene interpolymer, or an ethylene/alpha-olefin interpolymer.

3. The composition of claim 1, wherein the weight ratio of component B to component A ≥1.0.

4. The composition of claim 1, wherein the weight ratio of component B to component A is from 1.5 to 25.0.

5. The composition of claim 1, wherein component B is present in an amount ≥25 wt %, based on the weight of the composition.

6. The composition of claim 1, wherein the olefin multi-block copolymer of component A is an ethylene/alpha-olefin multi-block copolymer.

7. The composition of claim 1, wherein component A has a melt index (190° C., 2.16 kg) from 0.5 to 30 g/10 min.

8. The composition of claim 1, wherein component A has a density from 0.860 to 0.890 g/cc.

9. The composition of claim 1, wherein component B has a melt flow rate (230° C., 2.16 kg)≤10 g/10 min.

10. The composition of claim 1, wherein component B has a density from 0.870 to 0.910 g/cc.

11. The composition of claim 1, wherein, for component B, subcomponent a is a polypropylene homopolymer, and subcomponent b is a propylene/ethylene copolymer.

12. The composition of claim 1, wherein component B is an in-reactor blend or alloy.

13. The composition of claim 1, wherein component B is an impact copolymer polypropylene.

14. An article comprising at least one component formed from the composition of claim 1.

15. The composition of claim 1, wherein the composition comprises from 40 wt % to 80 wt % of components A and B, based on the weight of the composition.

16. The composition of claim 1, wherein the composition comprises from 5.0 wt % to 30 wt % of component A, based on the weight of the composition.

17. A composition comprising the following components:
A) an olefin multi-block copolymer that has an I2≤30 g/10 min (190° C., 2.16 kg);
B) a propylene-based composition comprising the following:
   a) a propylene-based polymer; and
   b) at least one of a propylene/alpha-olefin interpolymer, a propylene/ethylene interpolymer, and an ethylene/alpha-olefin interpolymer;
wherein
the propylene-based composition has a $Tm_h$ (highest melting point) ≥130° C.; and
   wherein the composition comprises from 5.0 wt % to 30 wt % of component A, based on the weight of the composition; and wherein the composition comprises a tensile modulus from 20 to 100 MPa in accordance with ISO 527-3, a tensile strength >7 MPa in accordance with ISO 527-3, and good weldability ('pass' for a welding test, wherein a 'pass' for the welding test is that during the pulling of a welded strip with a seam of the composition, the seam remains intact).

18. The composition of claim 17, wherein the composition comprises from 5.0 wt % to 25 wt % of component A, based on the weight of the composition.

19. The composition of claim 17, wherein the composition comprises from 40 wt % to 85 wt % of components A and B, based on the weight of the composition.

20. An article comprising at least one component formed from the composition of claim 17.

* * * * *